United States Patent
Hooshmand et al.

(10) Patent No.: US 10,922,374 B1
(45) Date of Patent: Feb. 16, 2021

(54) TECHNIQUES TO DETERMINE RELATIONSHIPS OF ITEMS IN WEB-BASED CONTENT

(71) Applicant: Capital One Services, LLC, McLean, VA (US)

(72) Inventors: Habeeb Hooshmand, McKinney, TX (US); Geoffrey Dagley, McKinney, TX (US); Jason Hoover, Grapevine, TX (US); Stephen Wylie, Carrollton, TX (US); Micah Price, Plano, TX (US); Qiaochu Tang, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/662,068

(22) Filed: Oct. 24, 2019

(51) Int. Cl.
*G06F 16/9538* (2019.01)
*G06F 16/9536* (2019.01)
*G06F 16/951* (2019.01)

(52) U.S. Cl.
CPC ........ *G06F 16/9538* (2019.01); *G06F 16/951* (2019.01); *G06F 16/9536* (2019.01)

(58) Field of Classification Search
CPC .......................... G06F 16/3322; G06F 13/9532
See application file for complete search history.

(56) References Cited

U.S. PATENT DOCUMENTS

| | | | |
|---|---|---|---|
| 6,411,962 B1* | 6/2002 | Kupiec | G06F 16/313 |
| 8,589,434 B2 | 11/2013 | Liebald et al. | |
| 9,552,412 B1* | 1/2017 | Lowe | G06F 16/3325 |
| 2004/0064438 A1* | 4/2004 | Kostoff | G06F 16/35 |
| 2004/0098381 A1* | 5/2004 | Parikh | G06F 16/322 |
| 2011/0302155 A1* | 12/2011 | Yan | G06F 16/9535 |
| | | | 707/723 |
| 2012/0143911 A1 | 6/2012 | Liebald et al. | |
| 2019/0197431 A1* | 6/2019 | Gopalakrishnan | G06N 5/022 |

* cited by examiner

*Primary Examiner* — William Spieler
(74) *Attorney, Agent, or Firm* — Kacvinsky Daisak Bluni PLLC

(57) ABSTRACT

Embodiments may generally be directed components and techniques to receive and process an indication of a web-based search performed for an item of a plurality of items and determine a co-occurrence matrix comprising rows and columns having entries associated with the plurality of items. Each of the entries of the co-occurrence matrix may indicate a number of co-occurrences of two of the plurality items. Embodiments also include techniques to determine related pairs of the plurality of items based on the number of co-occurrences for each entry and a relationship threshold value indicating two of the items are related and provide an indication of each item of the plurality of items that is related to the item searched based on the related pairs determination.

18 Claims, 9 Drawing Sheets

400

DETERMINE CO-OCCURRENCES OF A PLURALITY OF ITEMS, EACH OF THE CO-OCCURRENCES TO INDICATE TWO OF THE PLURALITY OF ITEMS CO-OCCUR
405

GENERATE A CO-OCCURRENCE MATRIX COMPRISING ROWS AND COLUMNS HAVING ENTRIES ASSOCIATED WITH THE PLURALITY OF ITEMS
410

RECEIVE AN INDICATION OF A WEB-BASED SEARCH PERFORMED FOR AN ITEM OF THE PLURALITY OF ITEMS
415

DETERMINE RELATED PAIRS OF THE PLURALITY OF ITEMS BASED ON THE ENTRIES OF THE CO-OCCURRENCE MATRIX AND A RELATIONSHIP THRESHOLD VALUE, WHEREIN EACH RELATED PAIR INCLUDES THE ITEM SEARCHED AND ANOTHER ITEM OF THE PLURALITY OF ITEMS
420

PROVIDING AN INDICATION OF EACH OF THE OTHER ITEMS OF THE PLURALITY OF ITEMS THAT IS RELATED TO THE ITEM SEARCHED BASED ON THE RELATED PAIRS DETERMINATION
425

RECEIVE AN INDICATION OF A WEB-BASED SEARCH PERFORMED FOR AN ITEM OF A PLURALITY OF ITEMS
505

DETERMINE A CO-OCCURRENCE MATRIX COMPRISING ROWS AND COLUMNS HAVING ENTRIES ASSOCIATED WITH THE PLURALITY OF ITEMS, WHEREIN EACH OF THE ENTRIES OF THE CO-OCCURRENCE MATRIX INDICATE A NUMBER OF CO-OCCURRENCES OF TWO OF THE PLURALITY ITEMS
510

DETERMINE RELATED PAIRS OF THE PLURALITY OF ITEMS BASED ON THE NUMBER OF CO-OCCURRENCES FOR EACH ENTRY AND A RELATIONSHIP THRESHOLD VALUE INDICATING TWO OF THE ITEMS ARE RELATED
515

PROVIDE AN INDICATION OF EACH ITEM OF THE PLURALITY OF ITEMS THAT IS RELATED TO THE ITEM SEARCHED BASED ON THE RELATED PAIRS DETERMINATION
520

GENERATE A CO-OCCURRENCE MATRIX COMPRISING ROWS AND COLUMNS HAVING ENTRIES ASSOCIATED WITH A PLURALITY OF ITEMS, WHEREIN EACH OF THE ENTRIES OF THE CO-OCCURRENCE MATRIX TO INDICATE A NUMBER OF CO-OCCURRENCES OF TWO OF THE PLURALITY OF ITEMS
605

STORE THE CO-OCCURRENCE MATRIX IN A DATABASE OF A DATASTORE
610

RECEIVE AN INDICATION OF A SEARCH PERFORMED FOR AN ITEM OF THE PLURALITY OF ITEMS USING A SEARCH ENGINE
615

DETERMINE THE ITEM IS ASSOCIATED WITH THE CO-OCCURRENCE MATRIX
620

OBTAIN THE CO-OCCURRENCE MATRIX FROM THE DATABASE
625

DETERMINE RELATED PAIRS OF THE PLURALITY OF ITEMS BASED ON THE NUMBER OF CO-OCCURRENCES AND A RELATIONSHIP THRESHOLD VALUE
630

PROVIDE AN INDICATION OF EACH ITEM OF THE PLURALITY OF ITEMS THAT IS DETERMINED TO BE RELATED TO THE ITEM SEARCHED BASED ON THE RELATED PAIRS DETERMINATION
635

*FIG. 6*

TECHNIQUES TO DETERMINE RELATIONSHIPS OF ITEMS IN WEB-BASED CONTENT

BACKGROUND

Users of online search systems often benefit from automated assistance in formulating queries and suggested search terms. For example, once a user submits a query, existing web search engines typically offer a set of query suggestions that provide assistance by helping a user narrow the focus of a search or explore different aspects of an active search task.

A search may include the query that a user submits, and the suggestions may be generated based on features of the item being searched. In one specific example, a user may search for a specific product and current systems may provide alternative suggestions of related products. These suggestions are typically based on items that have similar features. For example, a search for a vehicle may return suggestions that have similar features, e.g., miles per gallon (MPG), size, type, occupancy, electronic features, so forth. However, these suggestions may miss items that customers may consider related but lack a specific number of similar features. Embodiments discussed herein provide improvements to these systems and more accurate search suggestion results.

SUMMARY

Various embodiments described herein may include one or more devices, apparatuses, systems, components, and so forth to perform the operations of determining co-occurrences of a plurality of items, each of the co-occurrences to indicate two of the plurality of items co-occur, generating a co-occurrence matrix comprising rows and columns having entries associated with the plurality of items, wherein each of the entries of the co-occurrence matrix indicate a number of co-occurrences, and receiving an indication of a web-based search performed for an item of the plurality of items. Embodiments further include determining related pairs of the plurality of items based on the entries of the co-occurrence matrix and a relationship threshold value, wherein each related pair includes the item searched and another item of the plurality of items, and providing an indication of each of the other items of the plurality of items that is related to the item searched based on the related pairs determination.

Various embodiments described herein may include one or more devices, apparatuses, systems, components, and so forth to perform the operations receiving an indication of a web-based search performed for an item of a plurality of items, determining a co-occurrence matrix comprising rows and columns having entries associated with the plurality of items, wherein each of the entries of the co-occurrence matrix indicate a number of co-occurrences of two of the plurality items, and determining related pairs of the plurality of items based on the number of co-occurrences for each entry and a relationship threshold value indicating two of the items are related. Embodiments further include providing an indication of each item of the plurality of items that is related to the item searched based on the related pairs determination.

Various embodiments described herein may include one or more devices, apparatuses, systems, components, and so forth to perform the operations generating a co-occurrence matrix comprising rows and columns having entries associated with a plurality of items, wherein each of the entries of the co-occurrence matrix to indicate a number of co-occurrences of two of the plurality of items and storing the co-occurrence matrix in a database of a datastore. Embodiments may further include receiving an indication of a search performed for an item of the plurality of items using a search engine determining the item is associated with the co-occurrence matrix and obtaining the co-occurrence matrix from the database. Operations may also include determining related pairs of the plurality of items based on the number of co-occurrences and a relationship threshold value, and providing an indication of each item of the plurality of items that are determined to be related to the item searched based on the related pairs determination.

BRIEF DESCRIPTION OF THE DRAWINGS

FIG. 4 illustrates an example of a processing flow to determine relationships between items in web-based content.

FIG. 5 illustrates an example of a processing flow to provide suggestions for web-based searches.

FIG. 6 illustrates an example of a processing flow to provide suggestions for web-based searches.

DETAILED DESCRIPTION

Figure 1A:
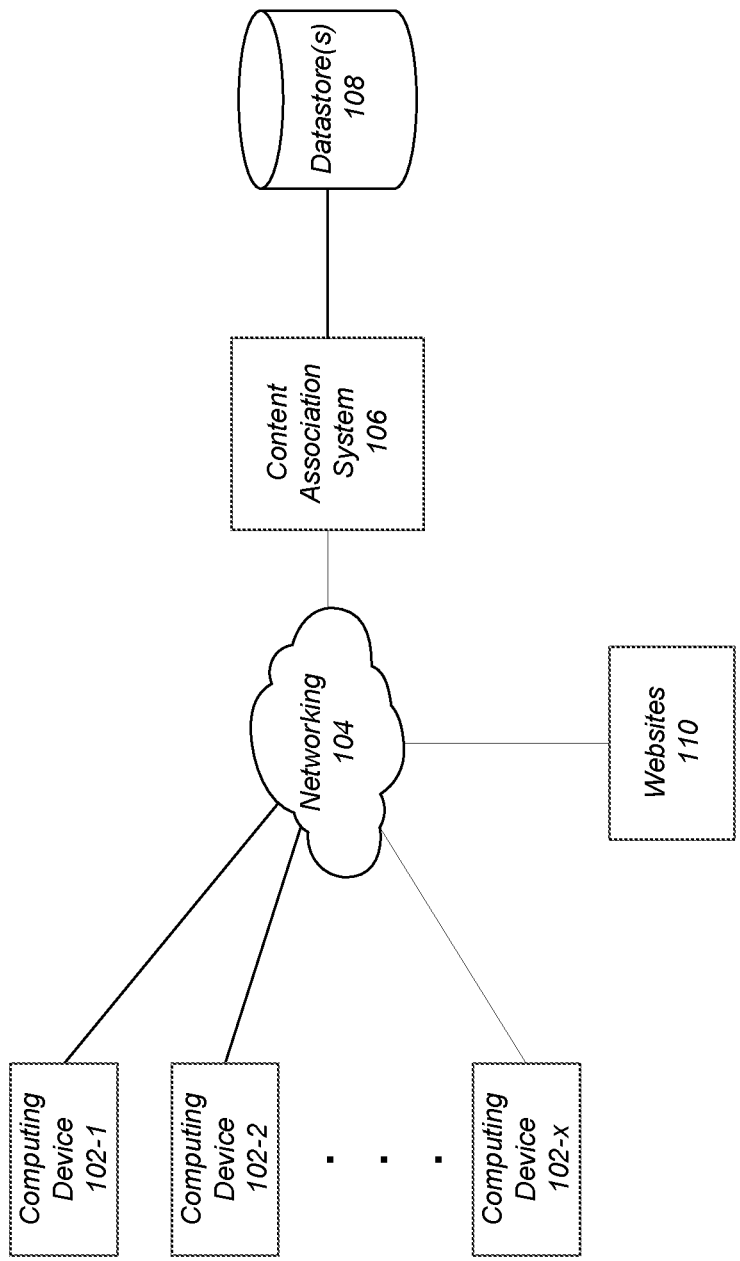
FIG. 1A illustrates an example of a system to determine relationships between items in web-based content.

Various embodiments may be generally directed to systems, devices, apparatuses, and so forth to perform techniques to determine relationships between items in web-based content and to provide suggestions for web searches based on the relationships. To determine relationships, a system may determine co-occurrences of items within one or more websites. For example, a website may include web-based content such as online articles including product reviews, product comparisons, expert opinions, expert advice, and so forth. The system may determine when two or more items, such as products, co-occur or are within the same piece of web-based content. To make the determination, the system may perform data mining techniques and crawl websites to determine related items. For example, the system may browse multiple websites having web-based content and keep a count of how many times an item occurs with another item in the same piece of web-based content. In other instances, the system may include an application, such as a browser applet, to capture searched items during a searching session. Items that are searched within the same search session may also be considered as co-occurred items. Based on the data mining and information collected by the application, the system may generate a co-occurrence matrix having entries associated with the plurality of items in a row and column configuration. Each of the entries of the co-occurrence matrix may indicate the count or number of co-occurrences between two items or item pairs.

In embodiments, the system may receive web-based search entries and make suggestions for the web-based searches utilizing information in a co-occurrence matrix. For example, the system may determine the related pairs of items based on the number of co-occurrences in the matrix above a relationship threshold value. Thus, if two items appear in articles together above the relationship threshold value, they may be considered related and providing a suggestion of the related item to the searched item may beneficial to the searching user. The system may provide an indication of each item of the plurality of items that is related to the item searched based on the related pair determination.

Various embodiments may include one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or fewer elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

FIG. 1A illustrates an example of a computing system 100 to process information and data to determine relationships between web-based content items and provide suggestions for web-based searches. As will be discussed in more detail below, embodiments include performing one or more operations to determine the relationships between items based on co-occurrences in the web-based content and/or based on searches performed during searching sessions. The system 100 may generate one or more co-occurrence matrices, each having entries indicating a number of co-occurrences between a pair of items. The co-occurrence matrices may be utilized to provide web-based search suggestions for searches performed by users. These and other details will become more apparent in the following description.

In the illustrated example, the system 100 includes one or more computing devices 102-x, where x may be any positive integer. A computing device 102 may be capable of accessing the Internet including websites 110 via one or more wireless and wired networking connections, e.g., networking 104. The websites 110 may include web-based content having information about any type of subject matter and techniques described herein should not be limited to a specific type of web-based content.

In embodiments, a computing device 102 may be a device, such as a personal computer, a desktop computer, a laptop computer, a tablet computer, a server, an embedded computer, a netbook, a mobile device, a personal digital assistant, a handheld computer, a workstation, etc. Moreover, a computing device 102 may be any type of device capable of communicating with other devices including devices hosting websites 110 of the Internet. As will be discussed in more detail in FIGS. 2A/2B and FIG. 3, a computing device 102 may include one or more processors coupled with memory and storage. The memory and storage may store instructions that may be executed by the one or more processors to perform the operations discussed herein.

For example, a computing device 102 may include applications including a web browser to enable a user of the computing device 102 to browse the websites 110.

The 100 includes a content association system 106, which may also be coupled with the computing devices 102-x and the websites 110 via networking 104. The content association system 106 may be any type of computing system. For example, the content association system 106 may include one or more servers having processors, memory, components, and controllers to perform the operations discussed herein. In instances, the content association system 106 may be cloud-based where one or more resources, such as the processors, memory, and storage may be allocated on need basis to perform operation discussed herein. In other instances, the content association system 106 may include in-house or local computing where the resources are owned and operated by an enterprise.

In embodiments, the content association system 106 may also be coupled with one or more datastores 108. A datastore 108 may be any type of storage system to store data and include hard desk drives, solid-state drives, optical storage devices, magnetic tape storage, nearline storage, and so forth. Moreover, the datastore 108 may include volatile and non-volatile storage. The datastore 108 may store data in a data structure, such as a database.

Figure 1B:
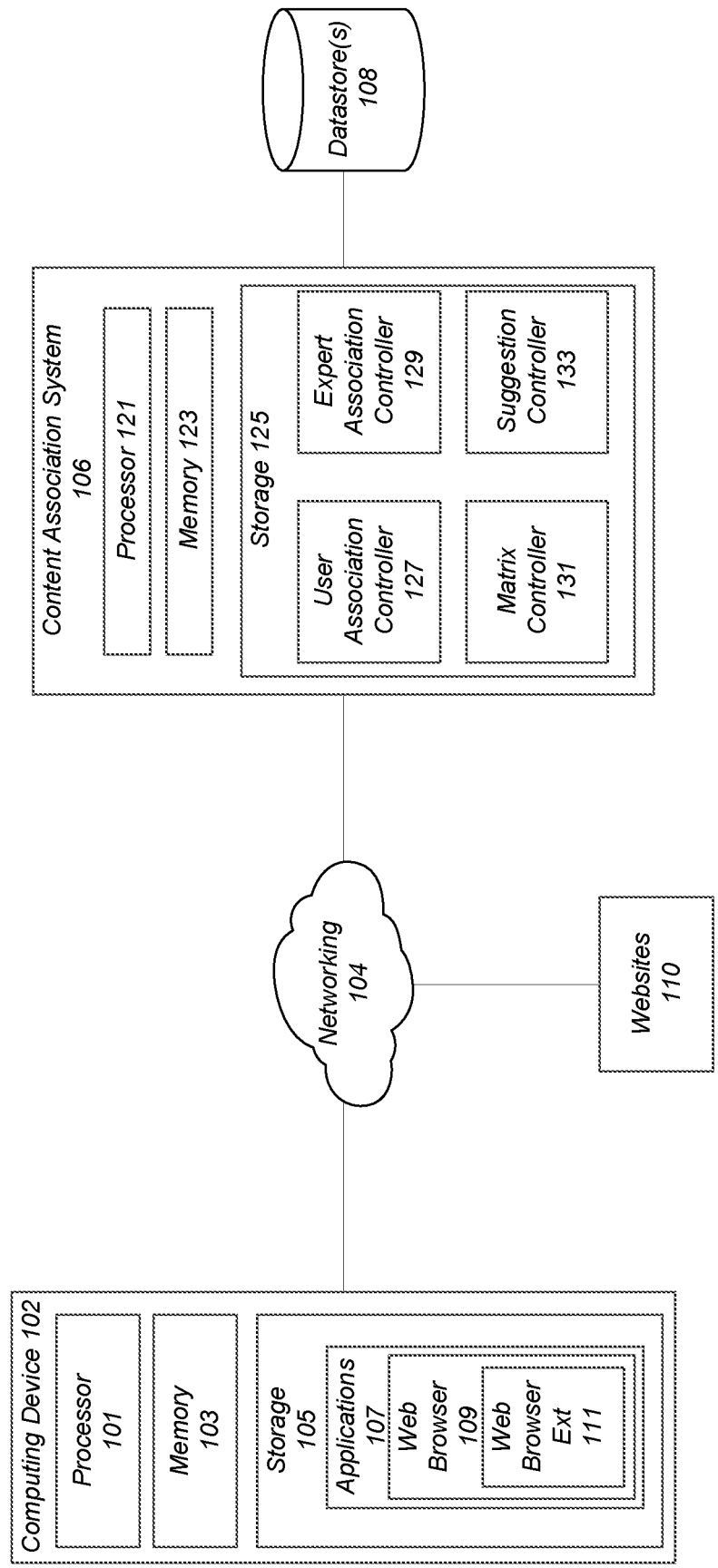
FIG. 1B illustrates a detailed example of the system of FIG. 1A.

FIG. 1B illustrates a detailed view of system 100. In the illustrated FIG. 1B, the computing device 102 includes processor 101, memory 103, and storage 105. The processor 101 may include one or more processing cores to process information and data. Moreover, a processor 101 can include one or more processing devices, such as a microprocessor manufactured by Intel™, AMD™, or any of various processors. The disclosed embodiments are not limited to any type of processor(s).

Coupled with the processor 101, the computing device 102 may also include memory 103. The memory 103 can include one or more memory (volatile or non-volatile) devices configured to store instructions used by the one or more processors 101 to perform one or more operations consistent with the disclosed embodiments. For example, memory 103 can be configured with one or more software instructions, such as programs and applications that can perform one or more operations when executed by the processor 101. In embodiments, the memory 103 may store instructions and data on a temporary basis as they are about to be processed by the processor 101.

In embodiments, the computing device 102 may further include a storage 105 coupled with the processor 101 and memory 103. The storage device 105 may include HDDs, flash memory devices, optical storage devices, floppy storage devices, etc. In some instances, the storage devices 105 may include cloud-based storage devices that may be accessed via a network interface. The storage device 105 may store one or more applications 107 that include instructions that may be executed by the processor 101.

In embodiments, one or more applications 107 may include an operating system, such as Windows®, Chrome®, Linux®, Apple OS®, and so forth. An operating system may enable other software applications to access and communicate with hardware devices. An application, which may include one or more instructions, may be configured to interact with the hardware devices, collect data from the hardware devices, and communicate with other systems. The one or more applications may also include a web browser 109, such as Chrome®, Internet Explorer®, Safari®, Firefox®, and so forth. The web browser 109 may be utilized by a user to surf or browse the websites 110 of the Internet.

Browsing the websites 110 may include causing the computing device 102 to communicate one or more messages with other devices via networking 104. These communications include requests and responses for a particular website 110. In some instances, the web browser 109 may be used to perform one or more searches via a search engine to find web-based content on the Internet and the websites 110.

In embodiments, the applications 107 including the web browser 109 may have one or more web browser extensions 111. A web browser extension 111 may be a software module to customize and perform functions for the web browser 109. In embodiments, discussed herein, the computing device 102 includes a web browser extension 111 that may collect search queries entered by users using a search engine in the web browser 109. The web browser extension 111 may collect each search query during a search session and communicate the query to the content association system 106 to determine item pairs and associations. A user may search for related items during a particular search session. In some embodiments, the web browser extension 111 may define the search session, including the start of the search session and the end of the search session. In one example, the search session may start when a new window or tab of the web browser 109 is open and end when the window or tab is closed. In another example, the search session may be defined for a period of time. More specifically, the web browser extension 111 may start a search session when a user makes a first search query and capture search queries for a defined period of time, e.g., 5 minutes. Once the 5 minutes have expired, the search session may end. In the third example, the search session may end after a period of time not searching. For example, the search session may start when the user performs a first search query and may end after a user has not performed a search for a defined period of time, e.g., 1 minute. In another example, a user may initiate the start and end of a search session where query data is captured. The user may interact with the web browser extension 111, e.g., input a button push to initiate the session, and provide another button push to end the search session. Embodiments are not limited in this manner.

In embodiments, the web browser extension 111 may capture and parse each search query to determine the terms of the search that are communicated to a backend search server of a search engine host. For example, the search query may include a search string of the terms used to search by a user. The search string including the terms may identify an item or a product. For example, the search string may be "red+truck," and the item may be a "red truck." In other words, the terms and search strings may be names of specific items or products a user is searching.

The web browser extension 111 may parse the search strings and determine the terms utilizing identifiers or tags in hypertext markup language (HTML) code or a universal resource locator (URL). The search string and terms may be part of the URL address used to call a search engine website. For example, the search query including the terms "red truck" may call https://www.searchengine.com/search?sourceid=chrome-psyapi2&ion=1&1&espv=2&ie=UTF-8&q=red%20truck&oq. The web browser extension 111 may parse the search query to determine the terms based on the tags "&q=" and "&oq". The "&q=" may indicate the beginning of the search string, "&oq" may indicate the end of the search string, and the characters in between may include the search string. Note that the format in this example is merely one example of a URL and tags, and different search engines may include different URL formats and tags to identify search terms for the search query. The web browser extension 111 may be configured to parse different search engine URLs differently. In some instances, the web browser extension 111 may look for the start search string identifier, e.g., '&q', and the end search string identifier, e.g., '&oq', to identify the search string. Further, each search string term may be separated by a character string, e.g., '%20', and the web browser extension 111 may be determined each term based on the separating character string. In embodiments, the web browser extension 111 may parse a search query using a javascript API to determine the terms of the search string. A URL associated with javascript may include "https://website.com/search/&query=red+truck, and the web browser extension 111 may identify the search query by the search query identifier, e.g., '&query'. Embodiments are not limited to these examples.

In embodiments, the web browser extension 111 may send the search string including the terms to the content association system 106. For example, the web browser extension 111 may communicate with a server of the content association system 106 in a distributed application structure (client-server model). The web browser extension 111 may include additional information with the search string when communicating with the content association system 106, such as the identifier of the search session and the identifier of the user of the search query. However, in other instances, the identity of the user performing the search may be anonymous. Further, the content association system 106 may utilize the search strings of a plurality of search queries during a specific search session to determine associated items and to generate a co-occurrence matrix.

In embodiments, the system 100 includes the content association system 106 having a number of components and devices to perform the operations discussed herein. In embodiments, the content association system 106 includes a number of servers in a server cluster or server farm architecture, for example. However, in other instances, the content association system 106 may be implemented in one server or computing device. The content association system 106 includes one or more processors 121, memory 123, and storage 125. In embodiments, the processors 121 can include any type of one or more processing devices, such as a microprocessor manufactured by Intel™, AMD™, or any of various processors.

The memory 123, coupled with the one or more processors 121, can include volatile and/or non-volatile memory devices configured to store instructions used by the one or more processors 121 to perform one or more operations consistent with the disclosed embodiments. For example, memory 123 can be configured with one or more software instructions, such as programs and applications that can perform one or more operations when executed by the processor 121. In embodiments, the memory 123 may store instructions and data on a temporary basis as they are about to be processed by the processor 121.

In embodiments, the content association system 106 may further include a storage 125 coupled with the processors 121 and memory 123. The storage device 125 may include HDDs, flash memory devices, optical storage devices, floppy storage devices, etc. In some instances, the storage devices 125 may include cloud-based storage devices that may be accessed via a network interface. The storage device 125 may store one or more applications and controllers that include instructions that may be executed by the processor 121 to perform the operations discussed herein.

In embodiments, the content association system 106 may include an operating system, such as Windows®, Chrome®, Linux®, Apple OS®, and so forth. An operating system may enable other software applications to access and communicate with hardware devices. An application, which may include one or more instructions, may be configured to interact with the hardware devices, collect data from the hardware devices, and communicate with other systems. For example, the content association system 106 includes a user association controller 127, an expert association controller 129, a matrix controller 131, and a suggestion engine 133, and the operating system may enable one or more of the controllers to perform operations discussed herein.

In embodiments, the user association controller 127 may be implemented in software only, hardware only, or a combination of software and hardware and embodiments are not limited in this manner. The user association controller 127 includes instructions that when processed by a processor process the data associated with search strings including the terms. For example, the user association controller 127 receives search strings for items or products from a web browser extension 111 of a computing device 102. The user association controller 127 may receive the search string including the terms and store it in a data structure, such as a database in the datastore 108. For example, the string "red+truck" may be stored as an entry in the database of the datastore 108. The user association controller 127 may also include a search session identifier with the search string in the data structure to indicate the search string is associated with a particular search session. The search string identifier may be any unique combination of alphanumeric characters to uniquely identify and associate search strings used to perform searches during the same search session. For example, a user may search for different vehicles (A, B, C, D, and E) during a first search session having a search session identifier of "1234." Thus, each search term (A, B, C, D, and E) may be stored in the data structure with the search session identifier "1234".

In embodiments, the user association controller 127 may receive search strings from many users and computing devices 102-x performing searches for items. Each of the search strings may be stored in the data structure with an associated search session identifier. For example, in addition to the example above, another user may search for vehicles during a second search session. The vehicles searched may be A, B, E, F, and G, and the search session identifier may be "5678". Entries for each search during the search session may be stored in the database and associated with the search session identifier.

In embodiments, the entries in the data structure may be used to generate co-occurrence matrices by a matrix controller 131. More specifically, the content association system 106 includes a matrix controller 131 to generate the co-occurrence matrices using search strings and terms for items searched and, as will be discussed in more detail below, terms found in web-based content performed during data mining sessions. A co-occurrence matrix may include terms and an indication of a number of times term pairs occur together, e.g., in the same search session or same web-based content.

The matrix controller 131 may be implemented in software only, hardware only, or a combination of hardware and software. In embodiments, the matrix controller 131 may operate to determine co-occurrences of items based on the data in a data structure in the database 108 and generate co-occurrence matrices. For example, the matrix controller 131 may generate an entry in the co-occurrence matrix each time two items appear together, e.g., are searched within the same search session based on the search session identifier or are indicated as occurring in the same piece of web-based content. Each of the co-occurrence entries indicate two of the plurality of items co-occurred within the same search session or content, for example. The matrix controller 131 determines the co-occurrences based on data collected across any number of search sessions and/or data mined in the web-based content. For example, if A and B are searched for in a first search session, a second search session, and a third search session, the matrix generation controller 131 indicates that A and B co-occurred three times in the co-occurrence matrix. Similarly, if C and D are found within a first article, a second article and a third article, the matrix generation controller 131 may determine C and D co-occurred three times in the co-occurrence matrix. The co-occurrence matrix may be generated from data from both search queries and data mining web-based content. For example, A and B may be searched in two different search sessions and found together in two different pieces of web-based content. In this example, the matrix controller 131 generates an entry indicating that A and B co-occurred four times.

In embodiments, the matrix controller 131 may generate any number co-occurrence matrices, and each co-occurrence matrix may be generated for a particular type of item. In this example, a co-occurrence matrix may be generated for vehicles. Thus, each entry in the co-occurrence matrix may be a type of vehicle. Moreover, each co-occurrence matrix may be more or less granular. For example, the co-occurrence matrix may cover all vehicles or a specific type of vehicle, e.g., truck, sports utility vehicle, sedan, etc. The type and granularity may be set or determined by a user of the system, computer determined, preconfigured, and so forth.

The matrix controller 131 generates a co-occurrence matrix in a rows and columns format having entries associated with the plurality of items and indicating a number of times item pairs that co-occurred. Below is one example of a co-occurrence matrix in table 1:

TABLE 1

|        | Item A | Item B | Item C | Item D | Item E |
|--------|--------|--------|--------|--------|--------|
| Item A |        | 4      | 3      | 0      | 6      |
| Item B | 4      |        | 2      | 9      | 9      |
| Item C | 3      | 2      |        | 4      | 2      |
| Item D | 0      | 9      | 4      |        | 3      |
| Item E | 6      | 9      | 2      | 3      |        |

In the above example co-occurrence matrix, Items A and B have co-occurred with each other 4 times, Items A and C have co-occurred with each other 3 times, Items B and C have co-occurred 2 times, and so forth. The entries of the co-occurrence matrix may indicate which items are more or less related to other items since users are more likely to search for like terms during the same search session or appear together within the same web-based content.

As will be discussed in more detail, a co-occurrence matrix may be used to make suggestions based on the number of times items co-occurred together. The matrix controller 131 may determine related pair of items having the number of co-occurrences above a relationship threshold value indicated by the entries of the co-occurrence matrix. The relationship threshold value may be preconfigured, set by a user, computer adjusted, etc. For example, the relationship threshold value may be set to a lower value when more suggested search terms are desired, and vice versa. For example, and with reference to the example matrix above, the relationship threshold value may be set to a higher value, such as 8, and a search for Item B, may return suggested search results of D and E. In another example, if more suggestions are desired, the relationship threshold value may be set to a lower value, such as 2, and a search for Item B may return a suggestion of Items A, C, D, and E. Note that returned suggestions may be used to perform additional searches or by a user to compare against the originally searched item. Embodiments are not limited in this manner.

In embodiments, the content association system 106 includes an expert association controller 129. The expert association controller 129 may perform data mining operations to determine a co-occurrence of terms within web-based content. The expert association controller 129 may be implemented in software only, hardware only, or a combination of hardware and software.

The expert association controller 129 may perform one or more data mining operations to determine terms that may occur within the same web-based content, such as websites, web-magazine articles, product review websites, and so forth. In some instances, the data mining operations may be performed on particular web-based content from known sources, authors, contributors, and so forth. With respect to the vehicle example, data mining operations may be performed on websites dedicated to vehicle reviews, associated with vehicle magazines (online and physical), message boards associated with vehicles, and so forth. The sources for the web-based content may be predetermined by an administrator or by performing machine-learning operations by the expert association controller 129.

In embodiments, the expert association controller 129 may perform a scrape or a crawl of the web-based content on the identified sources on a periodic, semi-periodic, and/or random basis. In some instances, a user or administrator may cause a scape or crawl on the web-based content. The scape or crawl may perform data extraction on the web-based content by identifying terms in web-based content. For example, the expert association controller 129 may utilize Xpath, JQuery, and Cascading Style Sheets (CSS) selector to identify the terms in an HTML webpage.

The expert association controller 129 may perform one or more formatting and manipulations on the scraped terms. For example, the expert association controller 129 may filter out commonly used terms, such as 'a', 'the', 'and', etc. The expert association controller 129 may perform other data mining techniques, such as generating a term frequency vector indicating a term and an occurrence frequency within the web-based content. The term frequency vector may be utilized to select terms to store in the database to generate a co-occurrence matrix, e.g. if the frequency is above a threshold value. In another example, the expert association controller 129 may search for proper nouns within the web-based content. Items may generally be identified by proper nouns or names and may be easily identifiable. The expert association controller 129 may use a 'dictionary' of known terms or names to identify terms within the web-based content. With respect to the vehicle example, a dictionary having a listing of every vehicle may be used to search for terms within web-based content directed to vehicles. Embodiments are not limited to these examples and other data mining techniques may be utilized to determine terms within the web-based content.

The expert association controller 129 may determine the terms and store them within a datastore or database, as previously mentioned. In embodiments, the expert association controller 129 may store each term from the same piece of web-based content with an identifier. The identifier may be utilized by the matrix controller 131 to generate a co-occurrence matrix. For example, the matrix controller 131 may include an indication of how many times two terms co-occurred with the same web-based content based on the same identifier associated with each of the terms, as illustrated in table 1. As discussed, a co-occurrence matrix may be used to provide suggestions to a user submitting a search query.

In embodiments, the content association system 106 may include a suggestion controller 133 to provide suggestions of items to users based on submitted search queries. The suggestion controller 133 may be implemented in software only, hardware only, or a combination of hardware and software. In one example, the suggestion controller 133 receives an indication of a web-based search performed for an item. The indication may include a search query having search term(s) and the web-based search may be any type of search. Examples of a search may be a search entered in a search engine web portal, a search entered in a search toolbar on a website, a search entered via a search engine assistant (Google® Assistant, Amazon® Alexa®, Microsoft® Cortana®, Apple® Siri®, etc.), and so forth. Moreover, the search query may be received from a computing device 102, which may include a mobile device, a personal computer, a smart speaker, a smart display, and so forth.

The suggestion controller 133 may determine a co-occurrence matrix related to the item and term(s) of the search query and based on the indication of the search performed. The content association system 106 may determine and/or retrieve a co-occurrence matrix including the term(s) based a lookup performed in the datastore having the database. For example, if the item and search term is a vehicle type, the suggestion controller 133 may determine and retrieve the co-occurrence matrix generated for vehicles. In some instances, if more than one co-occurrence matrix includes the search term(s), the suggestion controller 133 may retrieve the co-occurrence matrix having the highest number of appearances. For example, if on co-occurrence matrix indicates that searched item A has appeared four times and another co-occurrence matrix indicates that item A has appeared seven times, the suggestion controller 133 may retrieve the co-occurrence matrix having item A seven times.

In embodiments, the suggestion controller 133 may perform a related pair determination and analyze each entry of the co-occurrence matrix retrieved to determine whether the number of co-occurrences of other items in the matrix is above (and/or equal to) a relationship threshold value. Items appearing with the searched item a number of times above the relationship threshold value may be provided as suggestions to a user. Note that embodiments are not limited to any particular logical operation to determine whether a number of co-occurrences are above the relationship threshold value. For example, the opposite logic may be utilized and the suggestion controller 133 may remove items co-occurring with the searched item that is below the relationship threshold value as possible suggestions to provide to a user. The relationship threshold value may be set by a user or administrator. In other instances, the relationship threshold value may be based on a number of desired results or suggestions. For example, if four suggestions are desired, the suggestion controller 133 may set the relationship threshold value such that four related terms are determined and returned to the user.

In some embodiments, the suggestion controller 133 may retrieve the co-occurrence matrix for the searched item and generate a vector representation or list of the items. Each row of the co-occurrence matrix may be represented as a vector of co-occurrences for a particular item. For example and with reference to the data within table 1, table 2 illustrates a vector representation of the data in table 1. Note that X along the diagonal may also be a number of times the corresponding Item was searched. In some instances, a zero-entry may be put along the diagonal, which may store information, for example, there could be search sessions were only A is searched.

TABLE 2

Item A = <X, 4, 3, 0, 6>
Item B = <4, X, 2, 9, 9>
Item C = <3, 2, X, 4, 2>
Item D = <0, 9, 4, X, 3>
Item E = <6, 9, 2, 3, X>

The suggestion controller 133 may perform a distance measurement using the vector representation to find a distance between each item. The suggestion controller 133 may utilize a Euclidean distance measurement technique, a Jaccard distance measurement technique, and so forth. The distance between the items indicates which items are similar. In this example, the relationship threshold value may be a particular distance indicating that items are sufficiently similar and may be provided as a suggestion to a user. Thus, each item within the particular distance or relationship threshold value of the searched item may be provided to the user and a computing device 102. In addition, the relationship threshold value may be based on the measurement technique utilized, configured by a user or administrator and/or based on a number of desired suggestions. The content association system 106 may provide an indication of each item that is related to the item searched based on the related pair determination.

In embodiments, the suggestion controller 133 may provide an indication of each item related to the search item based on the related pair determination, e.g., items that co-occur a number of times above a threshold value, or items that are within a distance measurement using a vector representation. Each of the items may be communicated to the computing device 102 from which a user performed the search via networking 104, for example. Moreover, each of the items may be presented in a format readable by a user, e.g., within the search bar as an auto-completion suggestion or as a list with the web results. Embodiments are not limited in this manner.

Figure 2A:
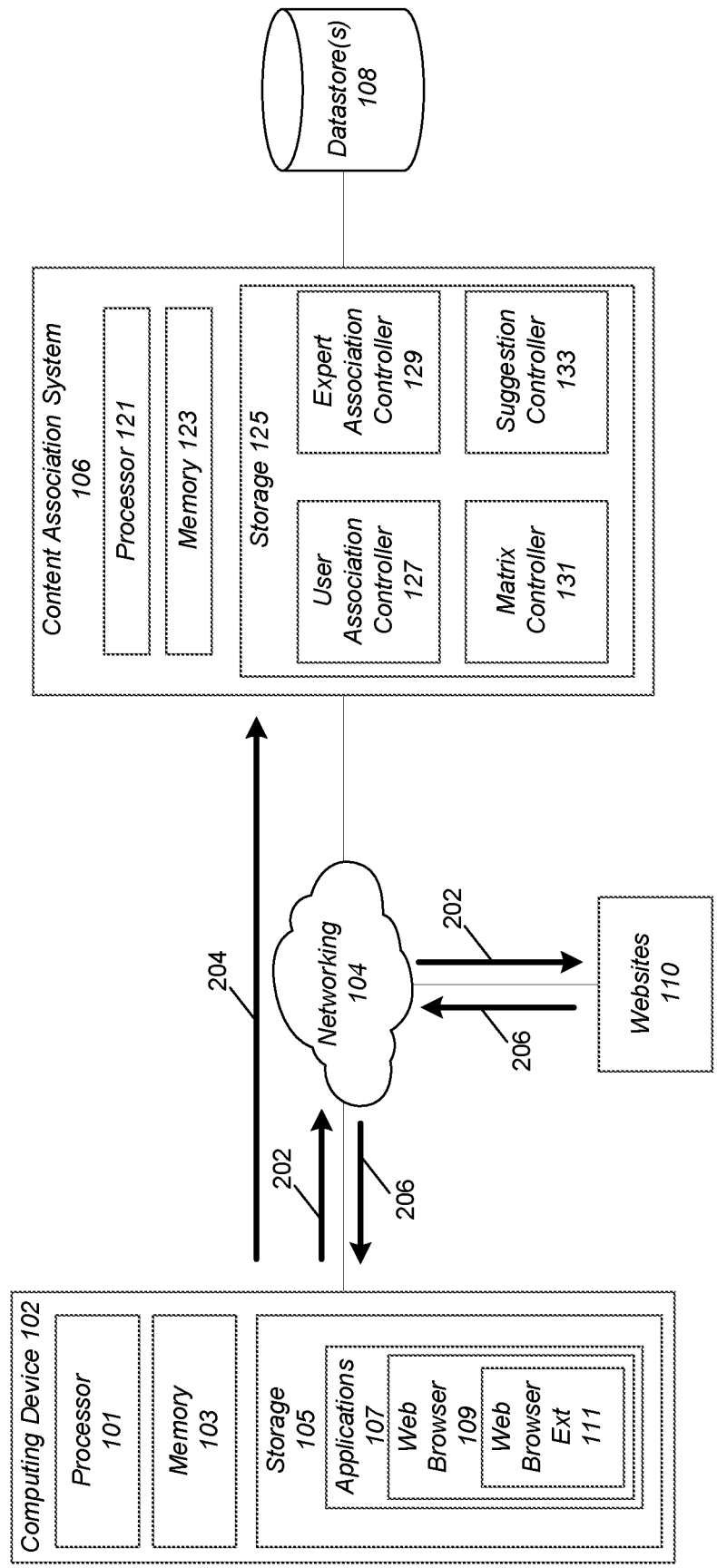
FIG. 2A illustrate example communication to determine relationships between items in web-based content based on performed searches.

FIG. 2A illustrates example communication flow 200 to determine relationships between items in web-based content based on performed searches. Communication flow 200 illustrates one possible communication flow to determine relationships between items based on searches. In some embodiments, one or more communications may occur before and/or after other communications.

At 202, the computing device 102 may communicate one or more search queries to a website 110 and backend servers, such as a search engine. The search query may include one or more terms for an item, for example. In embodiments, the computing device 102 may communicate a number of search queries for items, and each search query may include one or more search terms during a search session. Further and at 206, the search engine may return results to the computing device 102. The results are based on each search query received and processed by the search engine.

The computing device 102 including a web browser 109 and a web browser extension 111 may collect each search query and search terms for items during a search session and communicate the query including the search terms to the content association system 106 at 204. The terms may be used to determine a related pair of items, e.g., items searched during the same search session, and the content association system 106 may generate a co-occurrence matrix including the items.

Figure 2B:
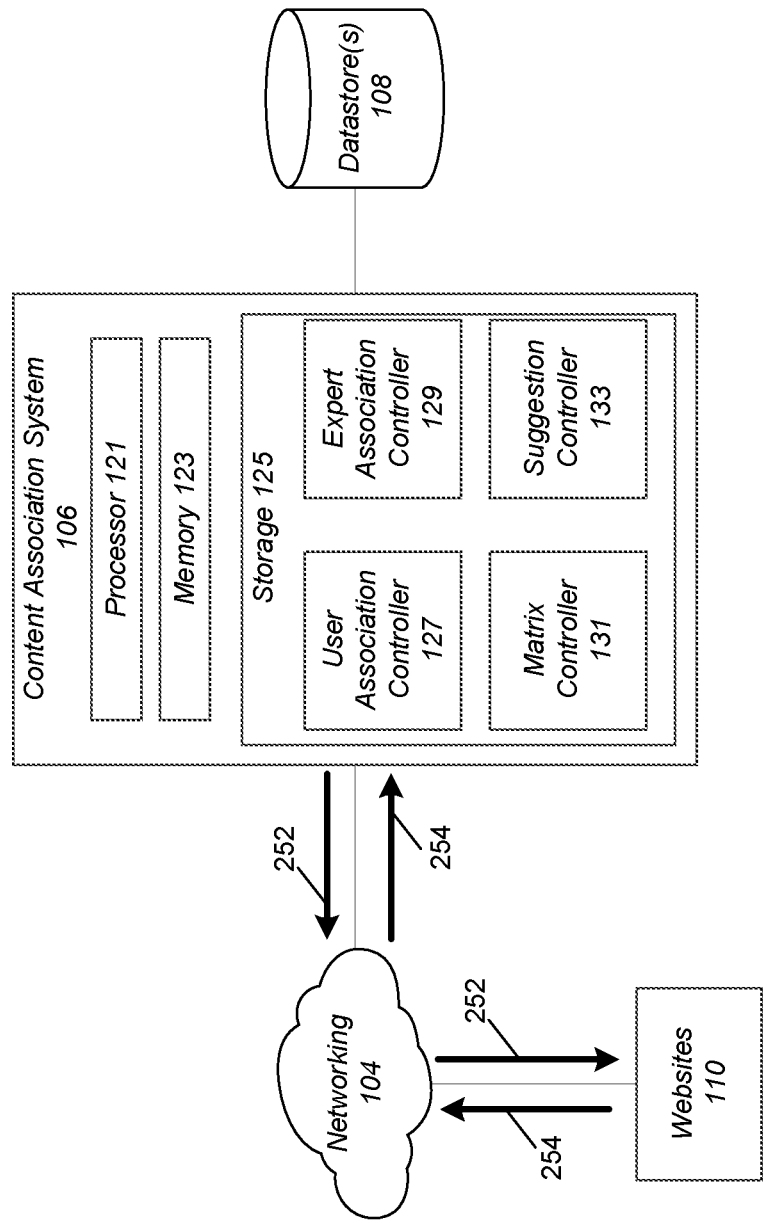
FIG. 2B illustrates example communication to determine relationships between items in web-based content based on data mining.

FIG. 2B illustrates example communication flow 250 to determine relationships between items in web-based content based on data mining. Communication flow 250 illustrates one possible communication flow to determine relationships between items based on searches. In some embodiments, one or more communications may occur before and/or after other communications.

In embodiments, the content association system 106 may perform a crawl or scrape of web-based content at 252. The crawl may include performing data mining operations to determine co-occurrence of terms within web-based content. The data mining operations may include determining terms that may occur within the same web-based content, such as websites, web-magazine articles, product review websites, and so forth. In some instances, the data mining operations may be performed on particular web-based content from known sources, authors, contributors, and so forth. The content association system 106 may perform the data mining operations on a periodic basis, a semi-periodic basis, random basis, and/or based on a user/administrator request.

At 254, the content association system 106 may receive results of the data mining operations. The results may include data from each of the websites 110 scraped by the content association system 106. The content association system 106 may also perform data extraction on the web-based content by identifying terms in web-based content. For example, content association system 106 may utilize Xpath, JQuery, and Cascading Style Sheets (CSS) selector to identify the terms in an HTML webpage. The content association system 106 may apply other data extraction techniques, e.g., identify and remove common words, identify proper nouns, and/or apply a dictionary to the data. The content association system 106 may determine the terms and store them within a datastore 108 including a database, as previously mentioned. In embodiments, the content association system 106 may store each term from the same piece of web-based content with an identifier and may generate a co-occurrence matrix.

Figure 3:
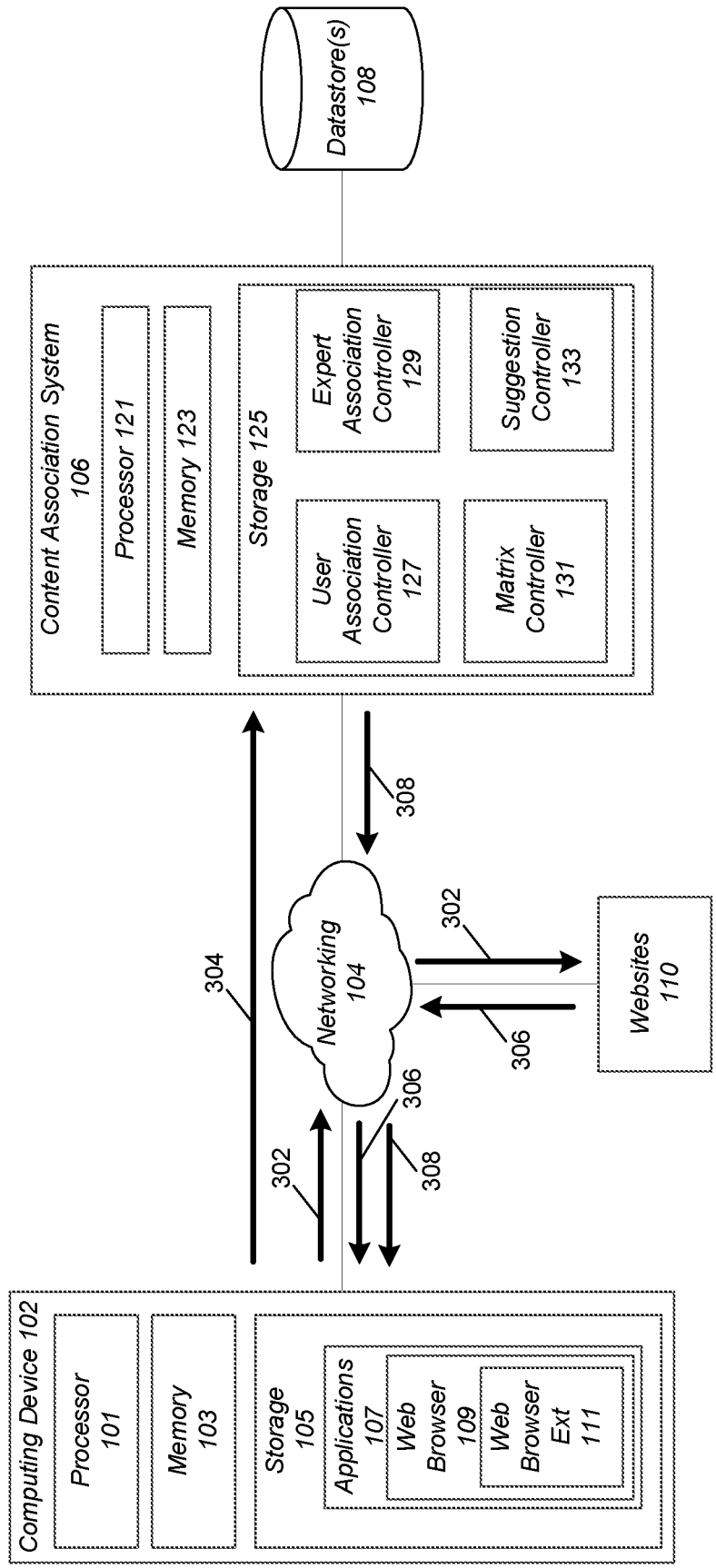
FIG. 3 illustrates example communication to provide suggestions for web-based searches.

FIG. 3 illustrate example communication flow 300 to provide suggestions for web-based searches. Communication flow 300 illustrates one possible communication flow to determine relationships between items based on searches. In some embodiments, one or more communications may occur before and/or after other communications.

At 302, the computing device 102 may communicate one or more search queries to a website 110 and backend servers, such as a search engine. The search query may include one or more terms for an item, for example. Further and at 306, the search engine may return results to the computing device 102 based on the search query. For example, the search engine including the backend servers may process the search query, determine results, and communicate the results back to the computing device 102.

In embodiments, the computing device 102 may also communicate the search query to the content association system 106 at 304. The content association system 106 may determine a co-occurrence matrix relating to the terms of the search query for a particular and perform a related pair determination. For example, the content association system 106 may determine items appearing with the searched item a number of times above a threshold value. In another example, the content association system 106 may generate a vector representation using the co-occurrence matrix and determine items within a distance measurement of the searched item. At 308, the content association system 106 may provide an indication of each item related to the search item based on the related pair determination. Each of the items may be presented as a suggestion in a format readable by a user on a display of the computing device 102, e.g., within the search bar as an auto-completion suggestion or as a list with the web results. Embodiments are not limited in this manner.

FIG. 4 illustrates an example of a logic flow 400 to generate a co-occurrence matrix and provide suggestions based on a search query. FIG. 4 illustrates an example of a logic flow 400 that may be representative of some or all of the operations executed by one or more embodiments and systems described herein, such as those discussed above in FIGS. 1A and 1B.

At block 405, the logic flow 400 includes determining co-occurrences of a plurality of items. In embodiments, each of the co-occurrences indicates two of the plurality of items co-occur within the same piece of web-based content or submitted during the same search session. In embodiments, each of the items or terms associated with items may be stored in a data store with an associated identifier indicating that the terms co-occurred.

At block 410, the logic flow 400 includes generating a co-occurrence matrix comprising rows and columns having entries associated with the plurality of items. Further, each of the entries of the co-occurrence matrix indicates a number of co-occurrences two items co-occurred. In embodiments, the number of co-occurrences may indicate two items co-occurred across one or more search sessions and found in web-based content. Thus, each entry may be representative of the number of co-occurrences for two items from one or more search sessions, one or more pieces of web-based content, and/or any combination thereof.

In embodiments, the co-occurrence matrix may be generated for a specific type of item. For example, a co-occurrence matrix may be generated for vehicles and another co-occurrence matrix may be generated for boats. Embodiments are not limited to these examples.

At block 415, the logic flow 400 includes receiving an indication of a web-based search performed for an item of the plurality of items. In embodiments, the co-occurrence matrix associated may be determined based on the item search, e.g., a type of the item may be determined. The co-occurrence may be stored in a database of a datastore and retrieved by a system to provide suggestions based on the search item.

For example and at block 420, the logic flow 400 includes determining related pair of the plurality of items based on the entries of the co-occurrence matrix and a relationship threshold value. Each related pair includes the item searched and another item of the plurality of items, e.g., the related item. At block 425, the logic flow 400 includes providing an indication of each of the other items of the plurality of items that is related to the item searched based on the related pair determination.

FIG. 5 illustrates an example of a logic flow 500 to provide suggestions based on a search query. FIG. 5 illustrates an example of a logic flow 500 that may be representative of some or all of the operations executed by one or more embodiments and systems described herein, such as those discussed above in FIGS. 1A and 1B.

At block 505, the logic flow 500 includes receiving an indication of a web-based search performed for an item of a plurality of items. The indication may include one or more terms used to perform the search as part of a search query. At block 510, the logic flow 500 includes determining a co-occurrence matrix comprising rows and columns having entries associated with the plurality of items, and each of the entries of the co-occurrence matrix indicates a number of co-occurrences of two of the plurality items.

At block 515, the logic flow 500 includes determining a related pair of the plurality of items based on the number of co-occurrences for each entry and a relationship threshold value. Each related pair includes the item searched and another item of the plurality of items, e.g., the related item. At block 520, the logic flow 500 includes providing an indication of each item of the plurality of items that is related to the item searched based on the related pair determination.

FIG. 6 illustrates an example of a logic flow 600 to generate a co-occurrence matrix and provide suggestions based on a search query. FIG. 6 illustrates an example of a logic flow 600 that may be representative of some or all of the operations executed by one or more embodiments and systems described herein, such as those discussed above in FIGS. 1A and 1B.

At block 605, the logic flow 600 includes generating a co-occurrence matrix comprising rows and columns having entries associated with a plurality of items, wherein each of the entries of the co-occurrence matrix to indicate a number of co-occurrences of two of the plurality of items. At block 610, the logic flow 610 further includes storing the co-occurrence matrix in a database of a datastore.

At block 615, the logic flow 600 includes receiving an indication of a search performed for an item of the plurality of items using a search engine. The logic flow 600 includes determining the item is associated with the co-occurrence matrix at block 620. For example, embodiments may include determining a type of the item searched and determining the co-occurrence matrix is associated with the type.

At block 625, the logic flow 600 includes obtaining the co-occurrence matrix from the database. For example, embodiments may include performing one or more lookups in a database using an identifier identifying the co-occurrence matrix. At block 630, the logic flow 600 includes determining the related pair of the plurality of items based on the number of co-occurrences and a relationship threshold value. The logic flow 600 includes providing an indication of each item of the plurality of items that are determined to be related to the item searched based on the related pair determination at block 630.

Figure 7:
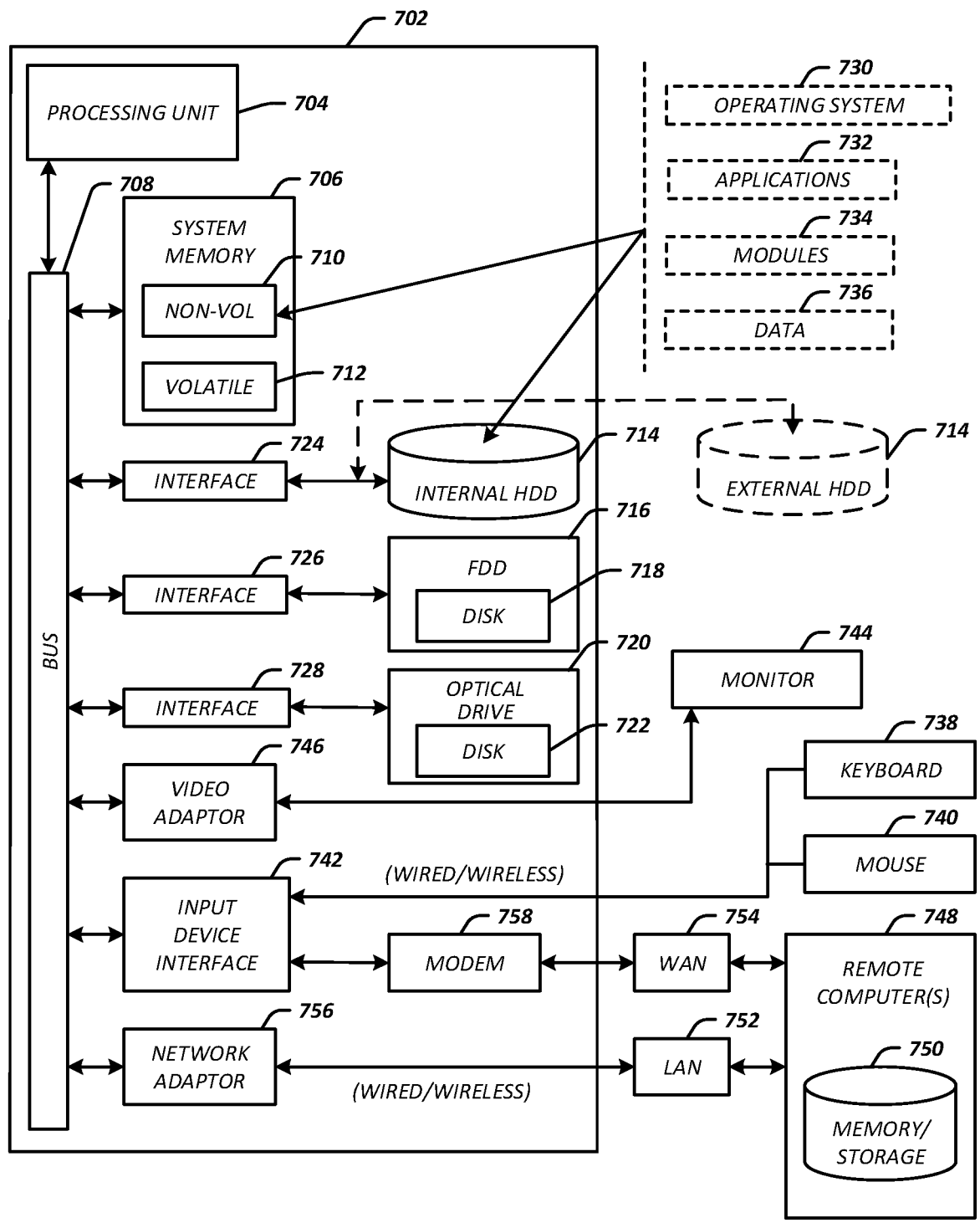
FIG. 7 illustrates an example of a computer architecture representative of one or more systems and devices discussed herein.

FIG. 7 illustrates an embodiment of an exemplary computing architecture 700 that may be suitable for implementing an apparatus, system, and/or method for performing operations associated with the implementation of one or more of the disclosed techniques. In various embodiments, the computing architecture 700 may comprise or be implemented as part of an electronic device and/or system discussed herein.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704. In some embodiments, processing circuitry of processing unit 704 and/or other processing circuitry of computing architecture 700 may be operative to perform operations associated with logic flow 500 and/or logic flow 600, and/or other operations associated with implementation of one or more of the disclosed techniques. In some embodiments, such processing circuitry may be coupled to a network interface of computing architecture 700.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/ wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, novel subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   determining, by a system, co-occurrences of a pair of items of a plurality of items, wherein each of the co-occurrences of the pair items is summed into a number of co-occurrences of the pair of items of the plurality of items in a search session comprising a plurality of search queries and in web-based content detected by a data mining operation, wherein the data mining operation is a web crawling operation;
   generating, by the system, a co-occurrence matrix comprising rows and columns, wherein each entry of the entries of the co-occurrence matrix indicates the number of co-occurrences between the pair of items of the plurality of items;

receiving, by the system, an indication of a web-based search performed for an item of the plurality of items;

determining, by the system, related pairs of the plurality of items based on the entries of the co-occurrence matrix and a relationship threshold value, wherein each related pair includes the item searched in the web-based search and another item of the plurality of items; and providing, by the system, an indication of each other item of the plurality of items that is related to the item searched based on the related pairs.

2. The computer-implemented method of claim 1, comprising determining the co-occurrences during the search session and based on the items searched in the plurality of search queries.

3. The computer-implemented method of claim 1, further comprising: determining a portion of the sum of the number of times the items co-occur when the data mining operation is performed on the web-based content to determine when at least two items of the plurality of items co-occur in the web-based content.

4. The computer-implemented method of claim 3, wherein the web-based content comprises one of an expert opinion article, an expert opinion review, and a web-based article, and two items co-occur when they appear in a same web-based content.

5. The computer-implemented method of claim 1, further comprising: analyzing each entry of the co-occurrence matrix to determine whether the number of co-occurrences is above the relationship threshold value, wherein each entry above the relationship threshold value indicates two items atoll are related to one another.

6. The computer-implemented method of claim 1, comprising:
generating vector representations for each item of the plurality of items in the co-occurrence matrix;
determining a vector representation corresponding to the item searched;
determining distance measurements between the item searched and each of the plurality of items based on the vector representation; and
determining items related to the item searched based on a particular distance measurement for each item within the relationship threshold value.

7. The computer-implemented method of claim 1, comprising:
storing the co-occurrence matrix in a datastore; and
retrieving the co-occurrence matrix from the datastore based on the indication of the item searched.

8. A system, comprising:
a computer processor: and
a memory to store instructions which when executed by the computer processor to cause the computer processor to:
receive an indication of a web-based search session performed for an item of a plurality of items;
generate a co-occurrence matrix comprising rows and columns, where each row of the rows and each column of the columns are associated with an item of the plurality of items, wherein an entry indicated by a first row and a first column of the co-occurrence matrix indicate a sum of a first number of co-occurrences and a second number of co-occurrences of a pair of items indicated by a first item corresponding to the first row and a second item corresponding to the first column;

determine related pairs of the plurality of items based on the sum of the first number of co-occurrences and the second number of co-occurrences for each entry and a relationship threshold value indicating two items are related; and provide an indication of each item of the plurality of items that is related to the item searched in the web-based search session based on the related pairs.

9. The system of claim 8, wherein the computer processor when executing the instructions is further configured to:
determine co-occurrences during the web-search session and based on one or more searches performed during the web-search session, wherein two items of the plurality of items co-occur when searched for the web-search session.

10. The system of claim 8, wherein the computer processor when executing the instructions is further configured to:
perform data mining on web-based content to determine when at least two items of the plurality of items co-occur in the web-based content, wherein the web-based content comprises at least one of an expert opinion article, an expert opinion review, and a web-based article.

11. The system of claim 8, wherein the computer processor when executing the instructions is further configured to:
analyze each entry of the co-occurrence matrix to determine whether the number of co-occurrences is above the relationship threshold value, wherein each entry above the relationship threshold value indicates two items of a related pair.

12. The system of claim 8, wherein the computer processor when executing the instructions is configured perform to:
generate vector representations for each item of the plurality of items in the co-occurrence matrix;
determine a vector representation corresponding to the item searched;
determine distance measurements between the item searched and each of the plurality of items based on the vector representation; and
determine items related to the item searched based on a particular distance measurement for each item within the relationship threshold value.

13. The system of claim 8, further comprising:
a datastore comprising a database, the datastore coupled with the computer processor, and the computer processor to:
store the co-occurrence matrix in the database; and
retrieve the co-occurrence matrix from the database based on the indication of the performed web-based search session.

14. A non-transitory computer-readable storage medium storing computer-readable program code executable by a processor to:
generate a co-occurrence matrix comprising rows and columns having entries associated with a plurality of items, wherein each of the entries of the co-occurrence matrix to indicate a sum of a first number of co-occurrences and a second number of co-occurrences of two items of the plurality of items, and wherein at least the first number of the co-occurrences are based on items co-occurring in a search session and at least a second number of the co-occurrences are based on items co-occurring in the web-based content detected by a data mining operation wherein the data mining operation is a web crawling operation;
store the co-occurrence matrix in a database of a datastore;

receive an indication of a search performed for an item of the plurality of items using a search engine;

determine the item is associated with the co-occurrence matrix;

obtain the co-occurrence matrix from the database;

determine a related pair of the plurality of items are related based on the number of co-occurrences and a relationship threshold value; and provide an indication of each item of the plurality of items that is determined to be related to the item searched based on the determination of the related pair.

15. The non-transitory computer-readable storage medium of claim 14, further comprising computer-readable program code executable to cause the processor to determine co-occurrences during the search session, the search session comprising one or more searches using the search engine, and two items of the plurality of items co-occur when searched in the search session.

16. The non-transitory computer-readable storage medium of claim 14, further comprising computer-readable program code executable to cause the processor to determine co-occurrences by performing data mining on the web-based content to determine when at least two items of the plurality of items co-occur in the web-based content, wherein the web-based content comprises at least one of an expert opinion article, an expert opinion review, and a web-based article.

17. The non-transitory computer-readable storage medium of claim 14, further comprising computer-readable program code executable to cause the processor to analyze each entry of the co-occurrence matrix to determine whether the number of co-occurrences is above the relationship threshold value, wherein each entry above the relationship threshold value indicates two items of a related pair.

18. The non-transitory computer-readable storage medium of claim 14, further comprising computer-readable program code executable to cause the processor to:

generate vector representations for each item of the plurality of items in the co-occurrence matrix;

determine a vector representation from the vector representations corresponding to the item searched;

determine distance measurements between the item searched and each of the plurality of items based on the vector representation; and determine items related to the item search based on a particular distance measurement for each item within the relationship threshold value.

\* \* \* \* \*

UNITED STATES PATENT AND TRADEMARK OFFICE
CERTIFICATE OF CORRECTION

PATENT NO. : 10,922,374 B1  
APPLICATION NO. : 16/662068  
DATED : February 16, 2021  
INVENTOR(S) : Habeeb Hooshmand et al.

Page 1 of 1

It is certified that error appears in the above-identified patent and that said Letters Patent is hereby corrected as shown below:

In the Claims

Column 19, Claim 5, Lines 33-34; Please replace "threshold value indicates two items atoll are related to one another." with --threshold value indicates two items that are related to one another.--

Column 20, Claim 14, Lines 63-64; Please replace "items co-occurring in the web-based content detected by a data mining operation wherein" with --items co-occurring in web-based content detected by a data mining operation, wherein--

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*